W. E. TURNER.
AUTOMATIC LIQUID WEIGHER.
APPLICATION FILED FEB. 7, 1919.

1,321,862.

Patented Nov. 18, 1919.
2 SHEETS—SHEET 1.

Inventor
Walter E. Turner,
By Howard S. Smith,
His Attorney

W. E. TURNER.
AUTOMATIC LIQUID WEIGHER.
APPLICATION FILED FEB. 7, 1919.

1,321,862.

Patented Nov. 18, 1919.
2 SHEETS—SHEET 2.

INVENTOR.
Walter E. Turner,
BY Howard S. Smith
ATTORNEYS.

UNITED STATES PATENT OFFICE.

WALTER E. TURNER, OF PIQUA, OHIO.

AUTOMATIC LIQUID-WEIGHER.

1,321,862.  Specification of Letters Patent.  Patented Nov. 18, 1919.

Application filed February 7, 1919. Serial No. 275,559.

*To all whom it may concern:*

Be it known that I, WALTER E. TURNER, a citizen of the United States, residing at Piqua, in the county of Miami and State of Ohio, have invented certain new and useful Improvements in Automatic Liquid-Weighers, of which the following is a specification.

The principal object of the invention is to provide an automatic liquid weigher that is particularly adapted for use in connection with boilers, for accurately registering the number of pounds of water evaporated by a definite quantity of coal. In thus comparing the amount of water used, with the amount of coal consumed, a manufacturer or other user may readily determine the kind of coal that will give him the most economic service. For example, if the device shows that only four pounds of water is evaporated by one pound of coal of one brand, and ten pounds by one pound of coal of another kind, it will be extremely useful in enabling him to determine what kind of coal to buy.

My automatic liquid weigher will be of like value in other lines, since it will accurately weigh all liquids regardless of their temperature. It will be particularly serviceable to persons who secure steam heat from a power company, in enabling them to determine whether they are getting all the heat they pay for. In the latter instance my automatic weighing device may be installed in the basement of a building or elsewhere, to weigh the water which the condensed steam forms after accomplishing its heating function. Other important and incidental objects will be brought out in the following specification, and particularly set forth in the subjoined claims.

Figure 1:
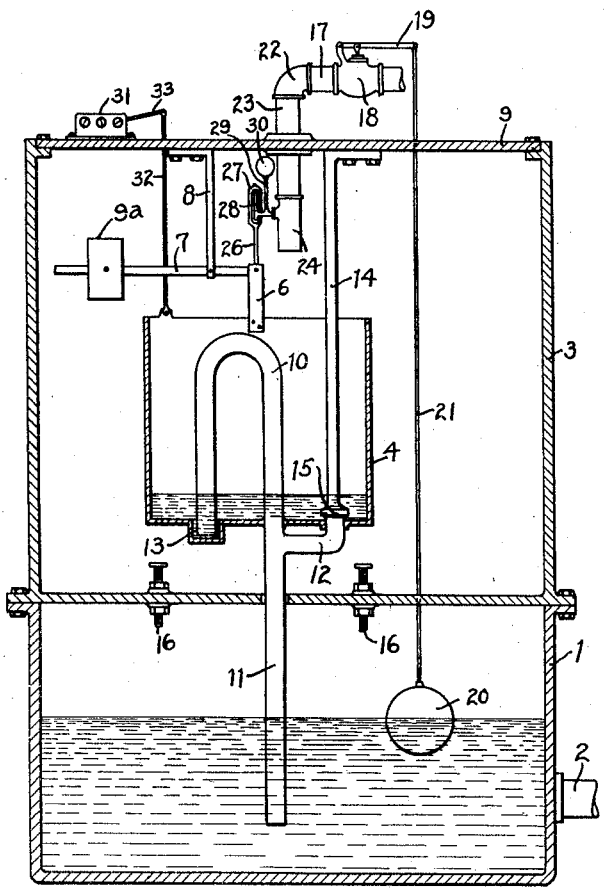
Figure 2:
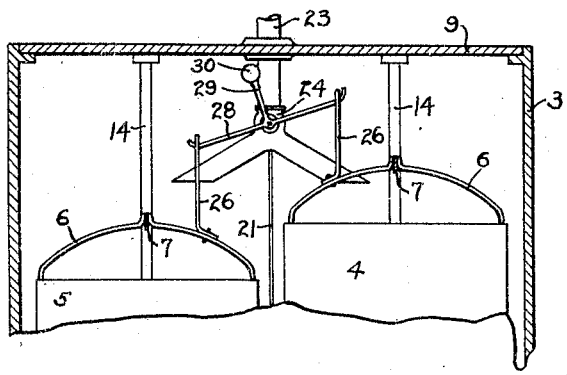
Figure 3:
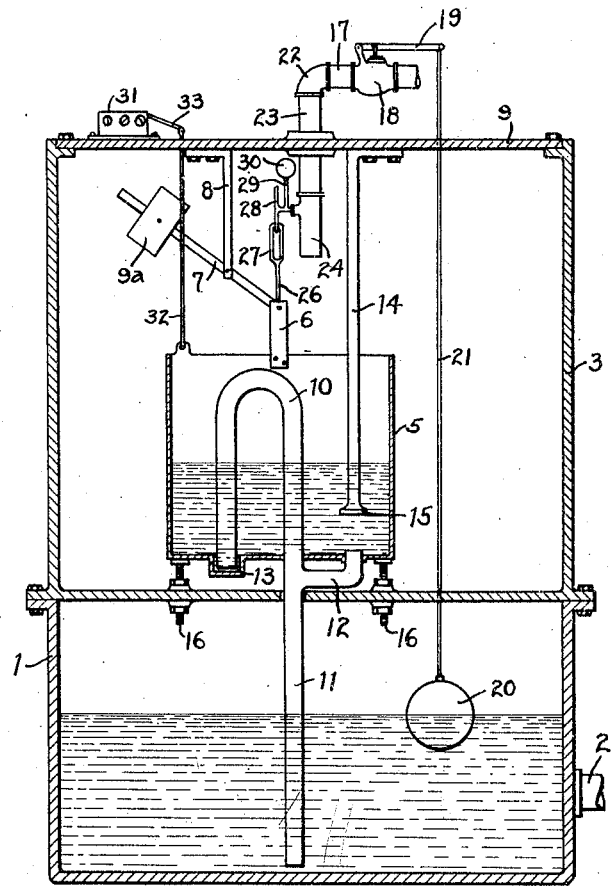
Figure 4:
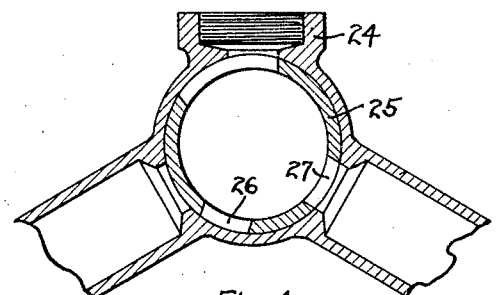

The preferred form of embodiment of my invention is illustrated in the accompanying drawings, of which Figure 1 is a side elevational view of the interior of my liquid weighing device, showing one weighing bucket in its uppermost position. Fig. 2 is an end view of said device, showing the means connected to the weighing buckets for operating the cut-off valve. Fig. 3 is side elevational view of the interior of my liquid weigher, showing a weighing bucket in its lowermost position. And Fig. 4 is a sectional view of the means for shifting the flow of liquid from one weighing bucket to the other.

Throughout the specification and drawings, similar reference characters denote corresponding parts.

Referring to the accompanying drawings, the numeral 1 designates a liquid container that is preferably rectangular in longitudinal section. At one end, and a short distance above its bottom, the container 1 has an outlet tube 2 for the liquid within it.

Mounted upon the container 1, and firmly secured to it, is a supporting frame 3 for the automatic weighing mechanism now to be described. This mechanism principally comprises two weighing buckets 4 and 5 that are vertically movable, side by side, within the inclosing frame 3, as shown in Fig. 2. Each of the buckets 4 and 5 has a bail 6 which is pivotally secured, at its upturned central portion, to one end of a lever 7. The latter, in turn, is pivotally secured, near its front end, to the downwardly extending portion of an angle support 8 that is firmly attached to the top plate 9 of the frame 3. Longitudinally adjustable on the outer end of the lever 7 is a weight $9^a$ for a purpose to be hereinafter described.

Projecting upwardly into each of the buckets 4 and 5, is the inverted-U shaped end 10 of a draft tube 11, whose lower end loosely extends through an opening in the bottom of the frame 3, below the level of the outlet tube 2 in the container 1. This tube also has a branch 12 which extends therefrom, at a point a short distance below its respective bucket, into the bottom of the latter at one side of its inverted-U shaped portion 10. The open end of the inverted-U shaped portion of the draft tube 11 projects into a pocket or recess 13 provided in the bottom of its respective bucket.

Suitably secured to the top plate 9 of the frame 3, is the foot of an inverted-L shaped member 14, whose lower end extends well into the bucket 4 below; while a similar member 14 extends into the bucket 5. Each member 14 terminates at its lower end in an enlarged valve portion 15 adapted to seal the branch 12 of the tube 11 when in its uppermost position as shown in Fig. 1. So long as said bucket remains in that position, any liquid poured into it will have no outlet through the draft tube 11. However, when said bucket is filled with liquid to a point where it overbalances the weight 9 on the outer end of the lever 7, it will descend until it engages two adjustable stops 16 16 screwed into the bottom of the frame 3, as shown in Fig. 3. As soon as the said bucket starts to descend, it will withdraw the upper end of the branch tube 12 from contact with the valve portion 15 of the member 14, whereupon the liquid within said bucket will immediately start to flow through the draft tube 11 into the container 1. This flow of liquid will continue until the bucket is emptied, even after the weight 9 lifts the bucket a sufficient distance to close the branch tube 12, since the inverted-U shaped portion 10 of the draft tube forms a siphon which, after being started by the descending bucket, will not be broken until all the liquid in the latter has been drawn into the container 1.

The means for filling the buckets 4 and 5, and the device for automatically changing the flow of liquid from one bucket that has been filled, to the other that has been emptied, irrespective of the position of the latter, will now be described. Leading from a suitable source of liquid supply (not shown) is a pipe 17 containing a shut off valve 18 operated by a lever 19 that is connected to a float 20 within the liquid in the container 1, by a rod 21. When the liquid within the container 1 rises to a predetermined level, the float 20 will be raised to shut off the flow of liquid through the pipe 17. When the valve 18 permits it to flow through the latter, the liquid will pass through a bend 22, and vertical pipe 23 into an inverted-Y shaped delivery tube 24, the open end of one branch of which is disposed above one bucket, and the open end of the other branch of which is disposed above the other bucket.

Movable in the upper end of the inverted-Y shaped tube 24, is a rotary valve 25 containing ports 26 and 27 adapted to alternately register with the outlet branches of said tube whereby, when the liquid is flowing through one of said branches to fill a weighing bucket, it will be restrained from entering the other bucket. While a rotary valve is shown for alternately changing this flow of liquid from one bucket to the other, any other form of valve for accomplishing this purpose may be employed without departing from the spirit of my invention.

The valve 25 is operated automatically by the following mechanism. Secured to, and projecting upwardly from, each bail 6 is a rod 26$^a$ that terminates at its upper end in a loop 27. Connected to the valve 25, for the purpose of turning it from a position in which one port registers with one branch of the tube 24, to a position wherein its other port registers with the other branch of said tube, is a lever arm 28. One end of the latter extends through the looped end of one rod 26$^a$, while its other end extends through the looped end of the other rod 26$^a$. Each end of said lever arm 28 is so set within the looped end of its respective rod 26$^a$ that, when a bucket is filled with sufficient liquid to overbalance its respective weight 9$^a$, and starts to descend, it will turn the valve 25 to a position to direct the flow of liquid into the other bucket that has been emptied.

It will be seen that before a bucket has been emptied, it will be drawn upwardly by its respective weight, since the downward pressure of the latter will overbalance the bucket before much liquid has been drawn from it. But when this occurs, the valve 25 will not be actuated, since the end of the lever 28 that has been drawn down, will be at the top of the loop in its respective rod 26$^a$ which must move upwardly to a point where the bottom of the loop engages said lever end. However, this will not occur until the other bucket has been filled, at which time the looped end of its respective rod 26$^a$ will draw the other end of the lever 28 downwardly, to turn the valve a sufficient distance to direct the flow of supply liquid into the bucket that has been completely emptied. And when the container 1 has been filled with liquid to a desired level, the flow thereof to either bucket will be cut off by the float 20. Furthermore, the level of the liquid in the container 1 cannot descend below the lower end of the draft tube 11, to break the siphon, since said tube projects below the level of the outlet tube 2.

For the purpose of preventing the valve 25 from stopping before it reaches either of its extreme positions, there is secured to the middle portion of the lever arm 28, an upwardly projecting element 29 that carries a ball 30 which prevents said valve from remaining in any other than either one of its extreme positions.

In order to record each time a weighing bucket is emptied, a register 31 is placed above it upon the top plate 9 of the frame 3. Through a rod 32 pivotally connected to an arm 33 operatively secured to said register, the latter will make a record of each time the bucket descends after being filled. Accordingly, by adjusting the weight 9$^a$ on the outer end of the lever 7, to hold up the bucket until it has been filled with a predetermined weight of liquid, it may be readily calculated how much liquid has been supplied to the container 1 during a certain period of time. Knowing the weight of this liquid, and the weight of the coal or other fuel used during that period to evaporate that liquid when it is used for forming steam, it further can be accurately determined how many pounds of liquid will be evaporated by one pound of the brand of coal used.

I do not wish to be limited to the details of construction and arrangement herein shown and described, and any changes or modifications may be made therein within the scope of the subjoined claims.

Having described my invention, I claim:

1. In a device of the type described, the combination with a vertically movable bucket, of a draft tube secured thereto, one branch of the upper end of said tube terminating in a siphon portion extending into said bucket, while a second branch of the upper end of said tube is in communication with the bottom of said bucket, a stationary valve member projecting through said bucket, adapted to close the upper end of the last mentioned branch of said draft tube when the bucket is in its uppermost position, a lever to the inner end of which said bucket is secured, an adjustable weight on the outer end of said lever, adapted to be overbalanced when the bucket is filled with a definite quantity of liquid, to permit the latter to descend below the level of the lower end of said valve member, whereupon the second branch of said draft tube will be uncovered to permit said liquid to flow through it, and through the siphon branch when the second branch is again closed, until the contents of said bucket have been emptied, and means for registering each time said bucket has been emptied.

2. In a device of the type described, the combination with a vertically movable bucket, of a draft tube secured thereto, one branch of the upper end of said tube terminating in an inverted-U shaped siphon portion extending well into said bucket, while a second branch of the upper end of said tube is in communication with the bottom of said bucket, a stationary member projecting into said bucket from above, a valve portion on the lower end of said member, adapted to close the upper end of the second branch of said tube when the bucket is in its uppermost position, a lever supporting said bucket, on its inner end, a longitudinally adjustable weight on the outer end of said lever, adapted to be placed in a position to be overbalanced by a definite quantity of liquid in said bucket, to permit the latter to descend below the level of the lower end of said valve, whereupon the second branch of said tube will be uncovered to permit said liquid to flow through it, and through the siphon branch of said tube when the second branch is again closed by said valve.

3. In a device of the type described, the combination with a pair of vertically movable liquid-weighing buckets, a pair of levers for supporting said buckets, each of the latter being secured to the inner end of its respective lever, automatic means for filling with a liquid one bucket while it is in its uppermost position, each bucket having an outlet opening in its bottom portion, means holding said outlet closed when the bucket is in its uppermost position, a weight on the outer end of each lever, which, when overbalanced by the weight of the liquid in its respective bucket, will permit the latter to descend to a position below its outlet closing means, allowing said bucket to be emptied, and means for automatically changing the flow of supply liquid from the first bucket, as soon as it has been filled, to the other bucket at the time it has been emptied.

4. In a device of the type described, the combination with a pair of vertically movable liquid-weighing buckets, a pair of levers for supporting said buckets, each of the latter being secured to the inner end of its respective lever, automatic means for filling with a liquid, one of said buckets while it is in its uppermost position, each bucket having an outlet opening in its bottom portion, means for holding said outlet opening closed when the bucket is in its uppermost position, a weight on the outer end of each lever, which, when overbalanced by the weight of the liquid in its respective bucket, will permit the latter to descend to a position below its outlet closing means, allowing said bucket to be emptied, a supply tube having a branch leading to each bucket, a valve in said tube to direct said liquid into one or the other of said buckets, and a device on each bucket for operating said valve to change the flow of liquid from one bucket, as soon as it has been filled, to the other bucket at the time it has been emptied.

5. In a device of the type specified, the combination with a pair of vertically movable liquid-weighing buckets, a pair of levers for supporting said buckets, each of the latter being secured to the inner end of its respective lever, means for filling with a liquid, one of said buckets while it is in its uppermost position, each bucket having an outlet opening in its bottom portion, means for holding said outlet opening closed when the bucket is in its uppermost position, a weight on the outer end of each lever, which, when overbalanced by the weight of the liquid in its respective bucket, will permit the latter to descend to a position below its outlet closing means, allowing said bucket to be emptied, a member having a looped upper end projecting upwardly from each bucket, a supply tube having a branch leading to each bucket, a valve in said tube to direct said liquid into one or the other of said buckets, and a lever arm projecting from said valve through the looped end of each upwardly projecting member in such a manner that the valve will not be turned to change the flow of liquid to one bucket until the other has been completely filled.

6. In a device of the class described, the combination with a vertically movable liquid receptacle, of means for holding the latter in an elevated position until it has been filled with liquid to a predetermined weight, an outlet passage in the bottom of said receptacle through which the liquid is discharged from said receptacle, a container below said receptacle to receive the liquid therefrom, and stationary valve means projecting into said receptacle from above, to cover the outlet passage in the bottom of the receptacle while the latter is in an elevated position for filling, and to uncover said passage after said bucket has been filled with sufficient liquid to overbalance the means that held it in an elevated position.

7. In a device of the class described, the combination with a pair of vertically movable liquid receptacles, means for alternately holding one receptacle in a position to be filled and the other in a position to be emptied, an outlet passage in the bottom of said receptacles through which the liquid is discharged therefrom, automatic means for filling with a liquid one bucket while it is in an elevated position, stationary valve means projecting into said receptacles from above, to cover the outlet passage in the receptacle being filled, and to uncover said passage after said receptacle has been filled with sufficient liquid to overbalance the means that held it in an elevated position, and means controlled by said receptacles for automatically changing the flow of supply liquid from the receptacle being filled, as soon as it has been filled, to the other receptacle at the time it has been emptied.

In testimony whereof I have hereunto set my hand this 5th day of February, 1919.

WALTER E. TURNER.

Witness:
HOWARD S. SMITH.